US006974548B2

(12) United States Patent
Giere et al.

(10) Patent No.: US 6,974,548 B2
(45) Date of Patent: Dec. 13, 2005

(54) PRINTHEAD HAVING A THIN FILM MEMBRANE WITH A FLOATING SECTION

(75) Inventors: Matthew D Giere, San Diego, CA (US); Jeffery S Hess, Corvallis, OR (US); Ulrich E Hess, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 10/430,645

(22) Filed: May 6, 2003

(65) Prior Publication Data

US 2003/0189622 A1 Oct. 9, 2003

Related U.S. Application Data

(62) Division of application No. 10/000,120, filed on Oct. 31, 2001, now Pat. No. 6,626,523.

(51) Int. Cl.$^{7}$ ........................ G11B 5/127; G01D 15/00

(52) U.S. Cl. ........................................ 216/27

(58) Field of Search ........................ 216/27; 438/21; 29/890.1; 347/20, 40, 44, 47, 54, 56, 61, 347/62, 64, 65, 71

(56) References Cited

U.S. PATENT DOCUMENTS

| | | | | |
|---|---|---|---|---|
| 6,003,977 | A | 12/1999 | Weber et al. | |
| 6,305,790 | B1 * | 10/2001 | Kawamura et al. | 347/65 |
| 6,402,301 | B1 * | 6/2002 | Powers et al. | 347/63 |
| 6,419,346 | B1 * | 7/2002 | Nikkel | 347/63 |
| 6,543,884 | B1 * | 4/2003 | Kawamura et al. | 347/65 |
| 6,627,467 | B2 * | 9/2003 | Haluzak et al. | 438/21 |
| 6,782,621 | B2 * | 8/2004 | Giere et al. | 29/890.1 |
| 2002/0101479 | A1 * | 8/2002 | Giere et al. | 347/54 |

FOREIGN PATENT DOCUMENTS

EP 1078754 A 2/2001

OTHER PUBLICATIONS

European Search Report, Application No. EP 02 02 3964, mailed Sep. 1, 2003.

* cited by examiner

*Primary Examiner*—Parviz Hassanzadeh
*Assistant Examiner*—Roberts Culbert

(57) ABSTRACT

A printhead including a printhead substrate having at least one opening formed in a first surface to provide a fluid path through the substrate. The printhead further includes a thin film membrane formed on a second surface of the substrate. The thin film membrane includes a plurality of fluid ejection elements and has a floating section and a cantilevered section, which are detached and separated from one another by a gap.

30 Claims, 6 Drawing Sheets

PRINTHEAD HAVING A THIN FILM MEMBRANE WITH A FLOATING SECTION

This is a divisional of Ser. No. 10/000,120 filed Oct. 31, 2001, now U.S. Pat. No. 6,626,523.

FIELD OF THE INVENTION

Embodiments of the present invention relate to printers and, more particularly to a printhead for a printer.

BACKGROUND OF THE INVENTION

Printers typically have a printhead mounted on a carriage that scans back and forth across the width of a sheet of paper, as the paper is fed through the printer. Fluid from a fluid reservoir, either on-board the carriage or external to the carriage, is fed to fluid ejection chambers on the printhead. Each fluid ejection chamber contains a fluid ejection element, such as a heater resistor or a piezoelectric element, which is independently addressable. Energizing a fluid ejection element causes a droplet of fluid to be ejected through a nozzle to create a small dot on the paper. The pattern of dots created forms an image or text.

Hewlett-Packard is developing printheads that are formed using integrated circuit techniques. A thin film membrane, composed of various thin film layers, including a resistive layer, is formed on a top surface of a silicon substrate, and an orifice layer is formed on top of the thin film membrane. The various thin film layers of the thin film membrane are etched to provide conductive leads to fluid ejection elements, which may be heater resistor or piezoelectric elements. Fluid feed holes are also formed in the thin film layers. The fluid feed holes control the flow of fluid to the fluid ejection elements. The fluid flows from the fluid reservoir, across a bottom surface of the silicon substrate, into a trench formed in the silicon substrate, through the fluid feed holes, and into fluid ejection chambers where the fluid ejection elements are located.

The trench is etched in the bottom surface of the silicon substrate so that fluid can flow into the trench and into each fluid ejection chamber through the fluid feed holes formed in the thin film membrane. The trench completely etches away portions of the substrate near the fluid feed holes, so that the thin film membrane forms a shelf in the vicinity of the fluid feed holes.

One problem faced during development of these printheads is that the thin film membrane and the orifice layer form a composite, which when subjected to stress can crack. When the composite is placed under stress, the thin film membrane, which is the stiffer of the two components, bears the majority of the stress. Thus, when the printhead is flexed or otherwise stressed, either during assembly or operation, the thin film membrane, particularly, in the shelf portion which overlies the trench, can crack. Cracking in the thin film membrane causes reliability problems with these printheads. The problem of flexure and stresses is exacerbated in longer printheads, which typically have larger trenches.

SUMMARY

Described herein is a printhead having a printhead substrate and a thin film membrane. The printhead substrate has at least one opening formed in a first surface to provide a fluid path through the substrate. The thin film membrane is formed on a second surface of the substrate and includes a plurality of fluid ejection elements. The thin film membrane has a floating and cantilevered section, which are detached and separated from each other by a gap formed in the thin film membrane. The floating section is located over the opening of the substrate, while the cantilevered section is substantially supported by the substrate.

BRIEF DESCRIPTION OF THE DRAWINGS

Embodiments of the present invention may be better understood, and its features and advantages made apparent to those skilled in the art, by referencing the accompanying drawings, wherein like reference numerals are used for like parts in the various drawings.

DETAILED DESCRIPTION

Figure 1:
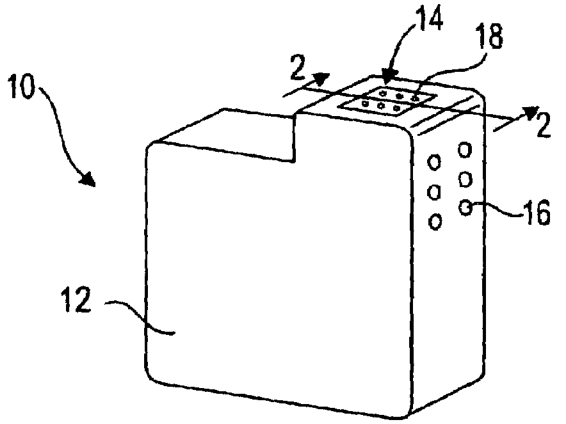
FIG. 1 is a perspective view of one embodiment of a print cartridge that may incorporate the printhead described herein.

FIG. 1 is a perspective view of one type of print cartridge 10 that may incorporate the printhead structure of the present invention. Print cartridge 10 is of the type that contains a substantial quantity of fluid within its body 12, but another suitable print cartridge may be the type that receives fluid from an external fluid supply either mounted on the printhead or connected to the printhead via a tube.

The fluid is supplied to a printhead 14. Printhead 14, to be described in detail later, channels the fluid into fluid ejection chambers, each chamber containing a fluid ejection element. Electrical signals are provided to contacts 16 to individually energize the fluid ejection elements to eject a droplet of fluid through an associated nozzle 18. The structure and operation of conventional print cartridges are very well known.

Embodiments of the present invention relate to the printhead portion of a print cartridge, or a printhead that can be permanently installed in a printer, and, thus, is independent of the fluid delivery system that provides fluid to the printhead. The invention is also independent of the particular printer, into which the printhead is incorporated.

Figure 2:
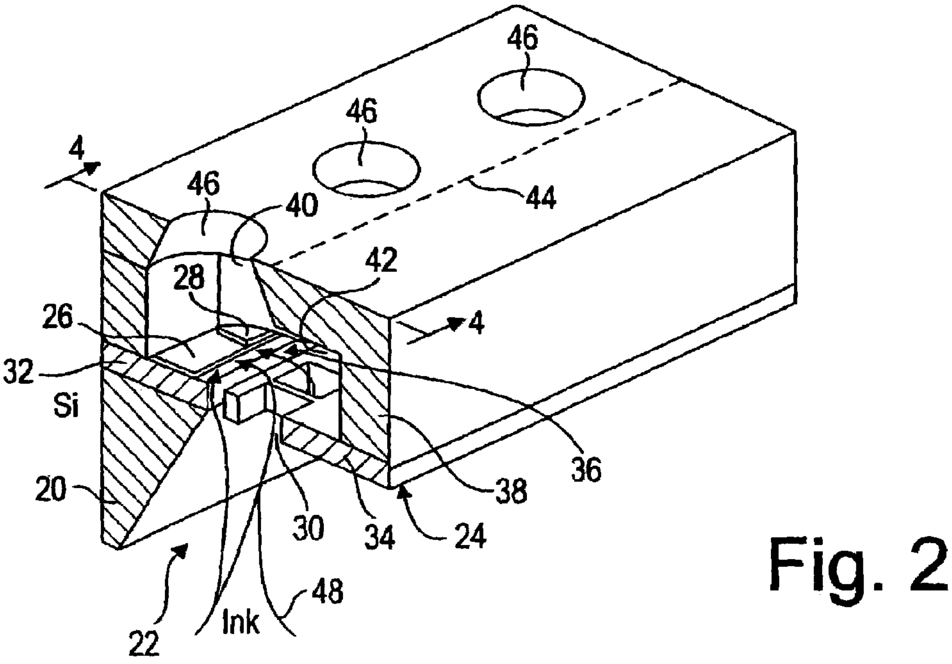
FIG. 2 is a perspective cutaway view, taken generally along line 2—2 in FIG. 1, of a portion of a printhead.

FIG. 2 is a cross-sectional view of a portion of the printhead of FIG. 1 taken generally along line 2—2 in FIG. 1. Although a printhead may have 300 or more nozzles and associated fluid ejection chambers, detail of only a single fluid ejection chamber need be described in order to understand the invention. It should also be understood by those skilled in the art that many printheads are formed on a single silicon wafer and then separated from one another using conventional techniques.

In FIG. 2, a silicon substrate 20 has an opening or trench 22 formed in a bottom surface thereof. Trench 22 provides a path for fluid to flow along the bottom surface and through substrate 20.

Formed on top of silicon substrate 20 is a thin film membrane 24. Thin film membrane 24 is composed of various thin film layers, to be described in detail later. The thin film layers include a resistive layer for forming fluid ejection elements or resistors 26. Other thin film layers perform various functions, such as providing electrical insulation from substrate 20, providing a thermally conductive path from the heater resistor elements to substrate 20, and providing electrical conductors to the resistor elements. One electrical conductor 28 is shown leading to one end of a resistor 26. A similar conductor leads to the other end of resistor 26. In an actual embodiment, the resistors and conductors in a chamber would be obscured by overlying layers.

Thin film membrane 24 includes fluid feed holes 30 that are formed completely through thin film membrane 24. In addition, thin film membrane 24 is divided into a cantilevered section 32 and a floating section 34. Cantilevered section 32 is substantially supported by substrate 20, while floating section 34 is suspended over trench 22 formed in substrate 20. Floating section 34 is separated on all sides from cantilevered section 32 by a gap 36 formed in thin film membrane 24. Each gap 36 has a width of approximately 0.1 microns. One of ordinary skill in the art will appreciate that the width of gaps 36 may be optimized to control the flow of fluid through printhead 14. The advantages of dividing thin film membrane 24 into cantilevered and floating sections 32 and 34, respectively, is described in greater detail below.

In another embodiment, floating section 34 is not separated on all sides from the remainder of the thin film layers but is only separated on one or both long sides to relieve stress.

An orifice layer 38 is deposited over the surface of thin film membrane 24. Orifice layer 38 is adhered to the top surface of thin film membrane 24, such that the two form a composite. The adhesion between thin film membrane 24 and orifice layer 38 is sufficient for orifice layer 38 to suspend floating section 34 of thin film membrane 24 over trench 22 in substrate 20, however, additional structures, as described below, may be used to further secure the two together.

Orifice layer 38 is etched to form fluid ejection chambers 40, one chamber per resistor 26. A manifold 42 is also formed in orifice layer 38 for providing a common fluid channel for a row of fluid ejection chambers 40. The inside edge of manifold 42 is shown by a dashed line 44. Nozzles 46 may be formed by laser ablation using a mask and conventional photolithography techniques.

Trench 22 in silicon substrate 20 extends along the length of the row of fluid feed holes 30 so that fluid 48 from a fluid reservoir may enter fluid feed holes 30 and supply fluid to fluid ejection chambers 40.

In one embodiment, each printhead is approximately one-half inch long and contains two offset rows of nozzles, each row containing 150 nozzles for a total of 300 nozzles per printhead. The printhead can thus print at a single pass resolution of 600 dots per inch (dpi) along the direction of the nozzle rows or print at a greater resolution in multiple passes. Greater resolutions may also be printed along the scan direction of the printhead. Resolutions of 1200 dpi or greater may be obtained using the present invention.

In operation, an electrical signal is provided to heater resistor 26, which vaporizes a portion of the fluid to form a bubble within a fluid ejection chamber 40. The bubble propels a fluid droplet through an associated nozzle 46 onto a medium. The fluid ejection chamber is then refilled by capillary action.

Figure 3:
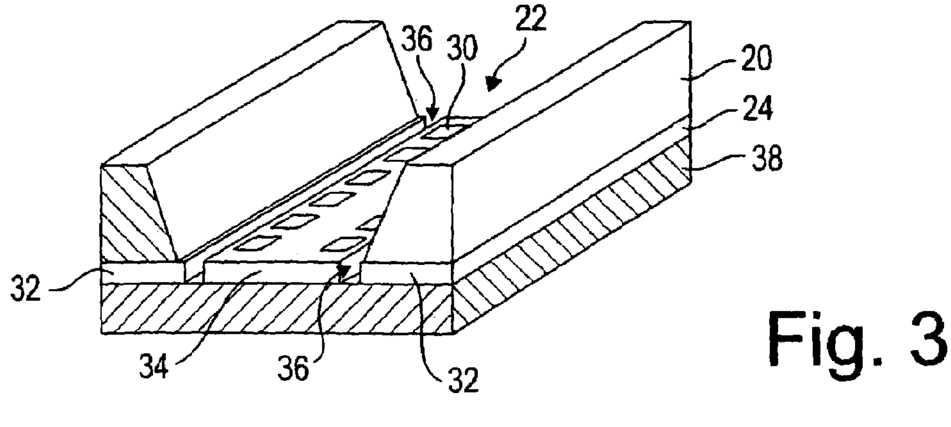
FIG. 3 is a perspective view of the underside of the printhead shown in FIG. 2.

FIG. 3 is a perspective view of the underside of the printhead of FIG. 2 showing trench 22 in substrate 20, gaps 36 separating floating section 34 of thin film membrane 24 from cantilevered section 32, and fluid feed holes 30 in floating section 34. In the particular embodiment of FIG. 3, a single trench 22 provides access to two rows of fluid feed holes 30. Trench 22 also provides access to gaps 36 such that fluid may flow through gaps 36 and into fluid ejection chambers 40. Floating section 34, which is suspended over trench 22, preferably has dimensions smaller than that those of trench 22.

In one embodiment, the size of each fluid feed hole 30 is smaller than the size of a nozzle 46, so that particles in the fluid will be filtered by fluid feed holes 30 and will not clog nozzle 46. The clogging of a fluid feed hole will have little effect on the refill speed of a chamber, since there are multiple fluid feed holes supplying fluid to each chamber 40. In another embodiment, there are more fluid feed holes 30 than fluid ejection chambers 40.

Figure 4:
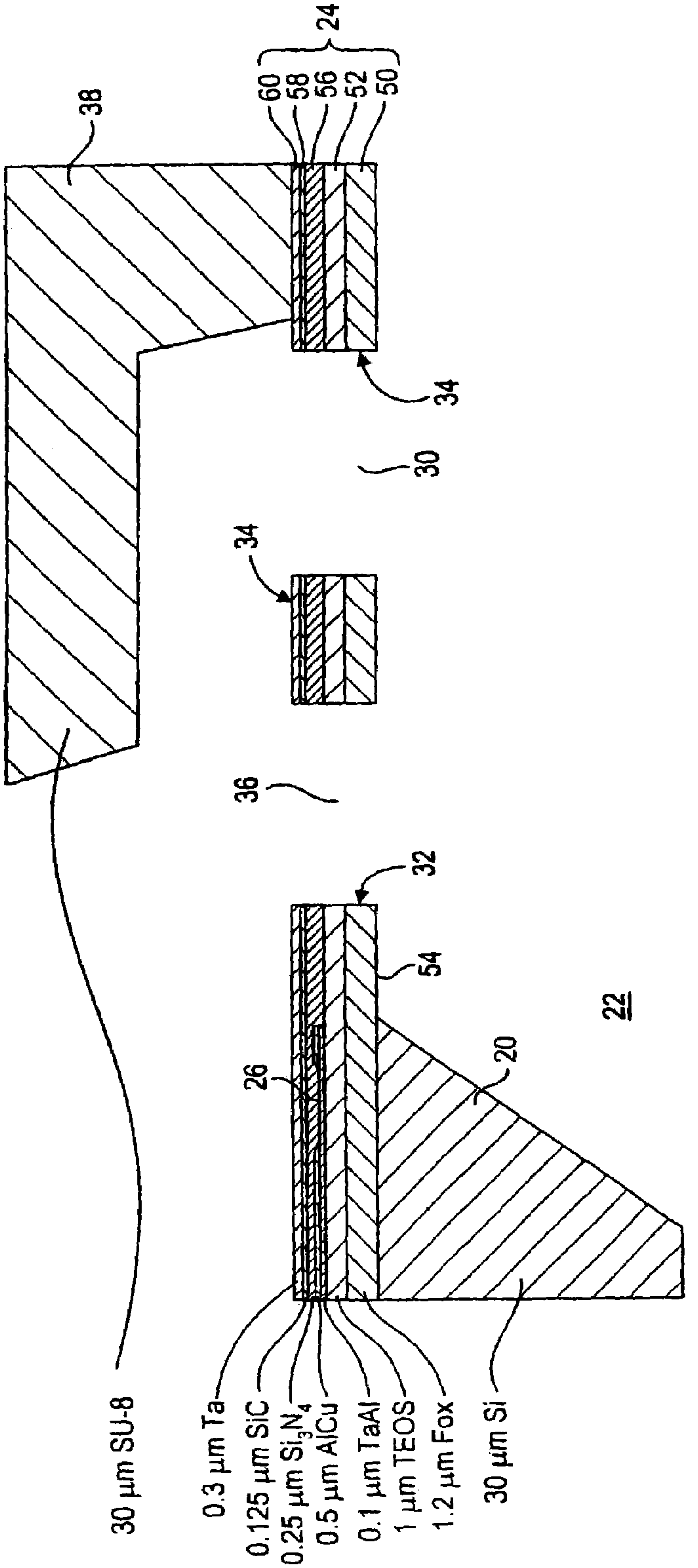
FIG. 4 is a cross-sectional view taken generally along line 4—4 in FIG. 3.

FIG. 4 is a cross-sectional view taken generally along line 4—4 in FIG. 2. FIG. 4 shows the individual thin film layers which comprise thin film membrane 24. In the particular embodiment of FIG. 4, the portion of silicon substrate 20 shown is approximately 30 microns thick. This portion is referred to as the bridge. The bulk silicon is approximately 675 microns thick.

A field oxide layer 50, having a thickness of 1.2 microns, is formed over silicon substrate 20 using conventional techniques A tetraethyl orthosilicate (TEOS) layer 52, having a thickness of 1.0 microns, is then applied over the layer of oxide 50. A boron TEOS (BTEOS) layer may be used instead.

A resistive layer of, for example, tantalum aluminum (TaAl), having a thickness of 0.1 microns, is then formed over TEOS layer 52. Other known resistive layers can also be used.

A patterned metal layer, such as an aluminum-copper alloy, having a thickness of 0.5 microns, overlies the resistive layer for providing an electrical connection to the resistors. The conductive AlCu traces are etched to reveal portions of the TaAl layer to define a first resistor dimension (e.g., a width). A second resistor dimension (e.g., a length) is defined by etching the AlCu layer to cause a resistive portion to be contacted by AlCu traces at two ends. This technique of forming resistors 26 and electrical conductors is well known in the art.

TEOS layer 52 and field oxide layer 50 provide electrical insulation between resistors 26 and substrate 20, as well as an etch stop when etching substrate 20. In addition, TEOS layer 52 and field oxide layer 50 provide a mechanical support for an overhang portion 54 of cantilevered section 32 and for floating section 34. The TEOS and field oxide layers also insulate polysilicon gates of transistors (not shown) used to couple energization signals to the resistors 26.

Referring back to FIG. 4, over the resistors 26 and AlCu metal layer is formed a silicon nitride ($Si_3N_4$) layer 56, having a thickness of 0.25 microns. This layer provides insulation and passivation. Prior to nitride layer 56 being deposited, the resistive and patterned metal layers are etched to pull back both layers from fluid feed holes 30 so as not to be in contact with any fluid. This is because the resistive and patterned metal layers are vulnerable to certain fluids and the etchant used to form trench 22. Etching back a layer to protect the layer from fluid may also apply to the polysilicon layer in the printhead.

Over the nitride layer 56 is formed a layer 58 of silicon carbide (SiC), having a thickness of 0.125 microns, to provide additional insulation and passivation. Other dielectric layers may be used instead of nitride and carbide.

Carbide layer 58 and nitride layer 56 are also etched to expose portions of the AlCu traces for contact to subsequently formed ground lines (out of the field of FIG. 4).

On top of carbide layer 58 is formed an adhesive layer 60 of tantalum (Ta), having a thickness of 0.3 microns. The tantalum also functions as a bubble cavitation barrier over the resistor elements. This layer 60 contacts the AlCu conductive traces through the openings in the nitride/carbide layers.

Gold (not shown) is deposited over tantalum layer 60 and etched to form ground lines electrically connected to certain ones of the AlCu traces. Such conductors may be conventional.

The AlCu and gold conductors may be coupled to transistors formed on the substrate surface. Such transistors are described in U.S. Pat. No. 5,648,806, assigned to the present assignee and incorporated herein by reference. The conductors may terminate at electrodes along edges of substrate 20.

A flexible circuit (not shown) has conductors, which are bonded to the electrodes on substrate 20 and which terminate in contact pads 16 (FIG. 1) for electrical connection to the printer.

Fluid feed holes 30 and gaps 36 are formed by etching through the layers that form thin film membrane 24. In one embodiment, a single feed hole and gap mask is used. In another embodiment, several masking and etching steps are used as the various thin film layers are formed.

Orifice layer 38 is then deposited and formed, followed by the etching of the trench 22. In another embodiment, the trench etch is conducted before the orifice layer fabrication. Orifice layer 38 may be formed of a spun-on epoxy called SU-8. Orifice layer 38 in one embodiment is approximately 30 microns.

A backside metal may be deposited, if necessary, to better conduct heat from substrate 20 to the fluid.

Figure 5:
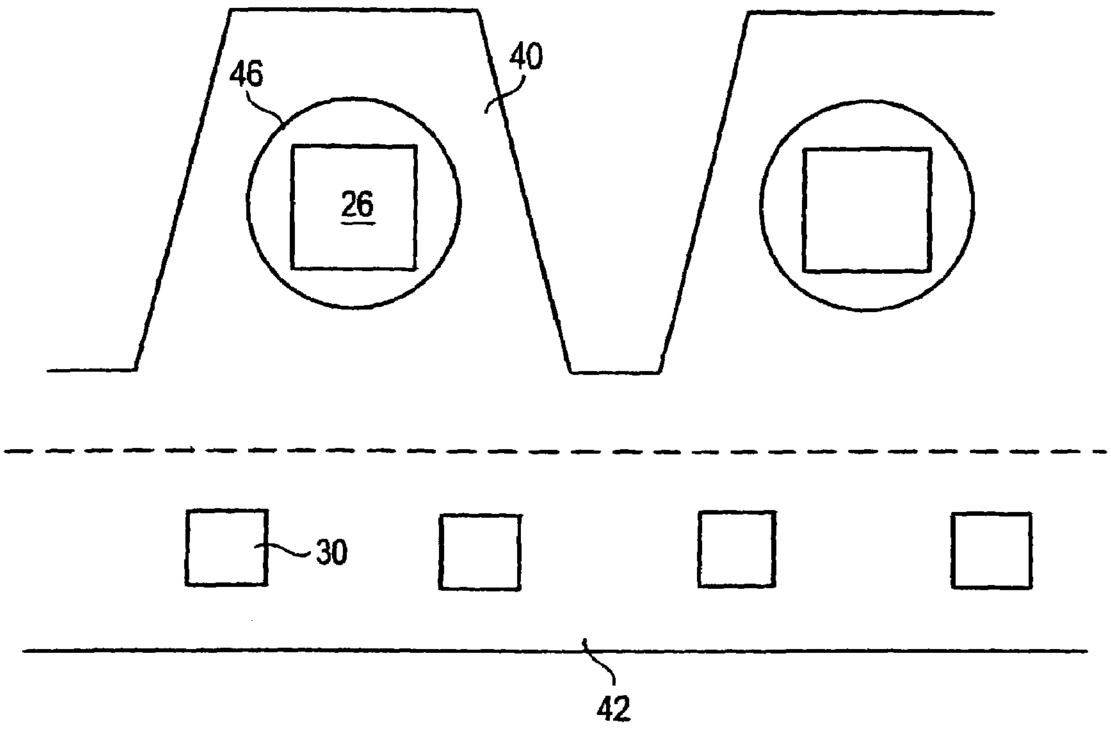
FIG. 5 is a top-down view of the printhead of FIG. 2 with a transparent orifice layer.

FIG. 5 is a top-down view of the structure of FIG. 2. The dimensions of the elements may be as follows: fluid feed holes 30 are 10 microns×20 microns; fluid ejection chambers 40 are 25 microns×25 microns; nozzles 46 have a diameter of 16 microns; heater resistors 26 are 20 microns×20 microns; and manifold 42 has a width of approximately 20 microns. The dimensions will vary depending on the fluid used, operating temperature, printing speed, desired resolution, and other factors.

The present invention provides a printhead with improved reliability. Since the composite formed by thin film membrane 24 and orifice layer 38 is not continuous throughout, due to gaps 36 in thin film membrane 24, it is less sensitive to the loads imposed by flexure of printhead 14. When flexure occurs, gaps 36 stop the propagation of stress through thin film membrane 24 and allow the lower modulus SU-8 material of orifice layer to bear the imposed load. Thus, by isolating floating section 34 of thin film membrane 24 from loads created by flexure of the die, the thin film membrane can remain over trench 22 in substrate, thereby taking advantage of the smaller features and tighter tolerances offered by integrated circuit techniques. Adjusting the width of gaps 36 also provides a way to control fluid refill other than through barrier architecture or through shelf length. In addition, the present invention requires no additional process steps, as gaps 36 may be formed simultaneously with fluid feed holes 30. Finally, the present invention enables the use of the thin film membrane in larger printheads that have a greater potential for flexure.

Figure 6A:
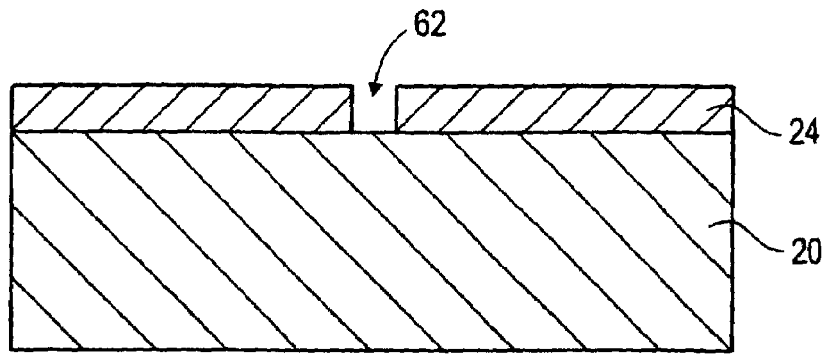
FIGS. 6A–6C are cross sectional views of one embodiment of the printhead during various stages of a manufacturing process for securing the thin film membrane of the printhead to the orifice layer.
Figure 6B:
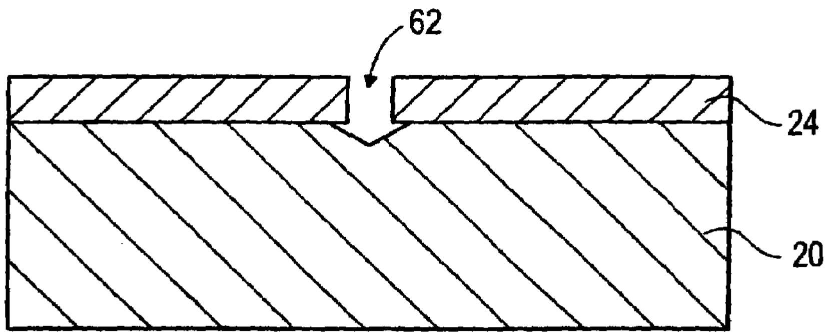
Figure 6C:
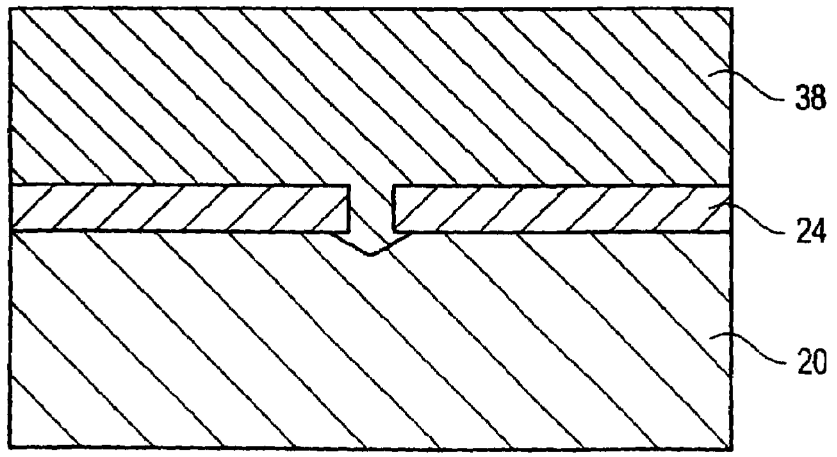

As discussed above, adhesion between the top layer of thin film membrane 24 and orifice layer 38 enables orifice layer 38 to suspend floating section 34 of thin film membrane 24 over trench 22 in substrate 20. Orifice layer 38 may also be further secured to thin film membrane 24. FIGS. 6A–6C illustrate a method of forming rivet-like structures to secure orifice layer 38 to thin film membrane 24. These structures may be formed, as needed, in floating section 34 of thin film membrane 24. In FIG. 6A, thin film membrane 24 is etched to form one or more openings 62 at desired locations for the rivets. Thin film membrane 24 is then used as a mask, and silicon substrate 20 is exposed to an anisotrophic etchant, such as TMAH. The etchant attacks the exposed silicon and undercuts the thin film membrane, as illustrated in FIG. 6B. Next, SU-8, the epoxy which forms orifice layer 38, is spun on. The epoxy material flows into the cavity created by the etchant, as illustrated in FIG. 6C. The SU-8 is then exposed and baked to cure, and the rivet is complete.

Figure 7:
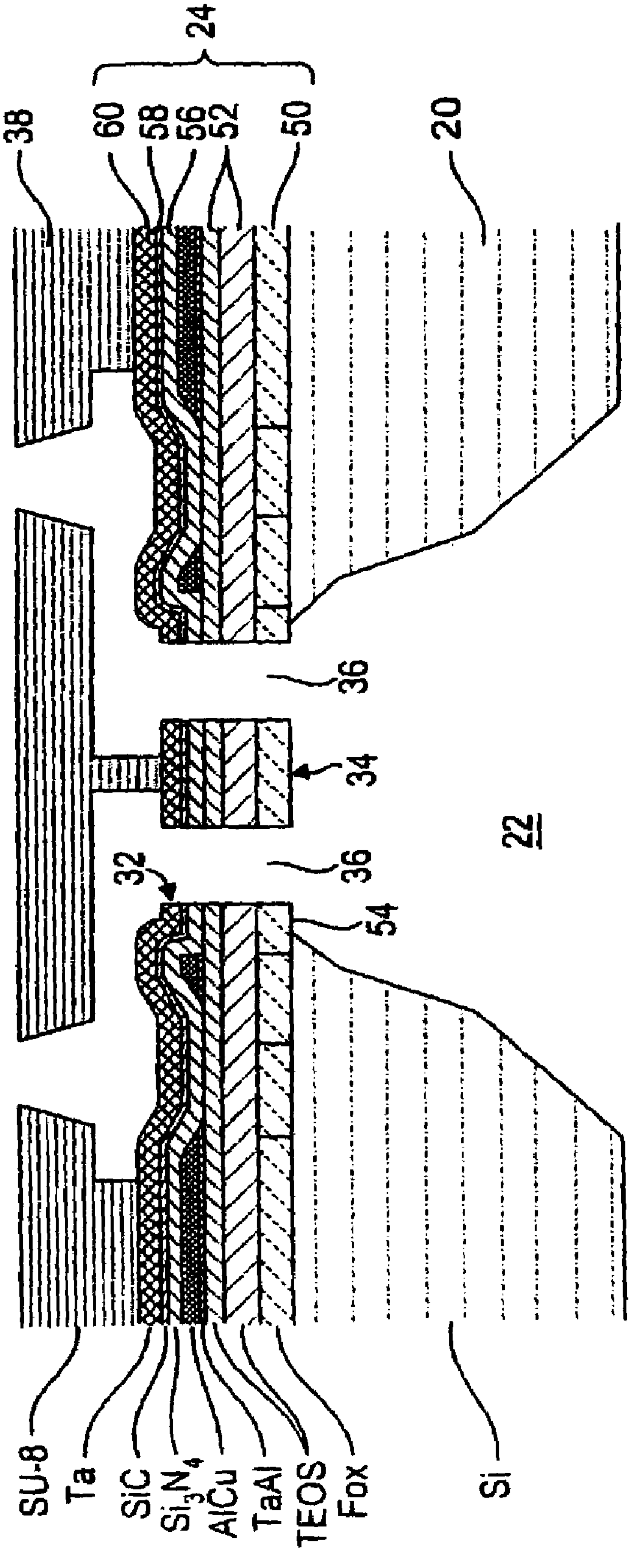
FIG. 7 is a cross-sectional view of an embodiment of a printhead without fluid feed holes.

FIG. 7 is a cross-sectional view of an embodiment of the invention without fluid feed holes. The layers of thin film membrane 24 are similar to those in FIG. 4. Unlike FIG. 4, there is no fluid feed hole 30. Rather, fluid flows through gaps 36.

Figure 8:
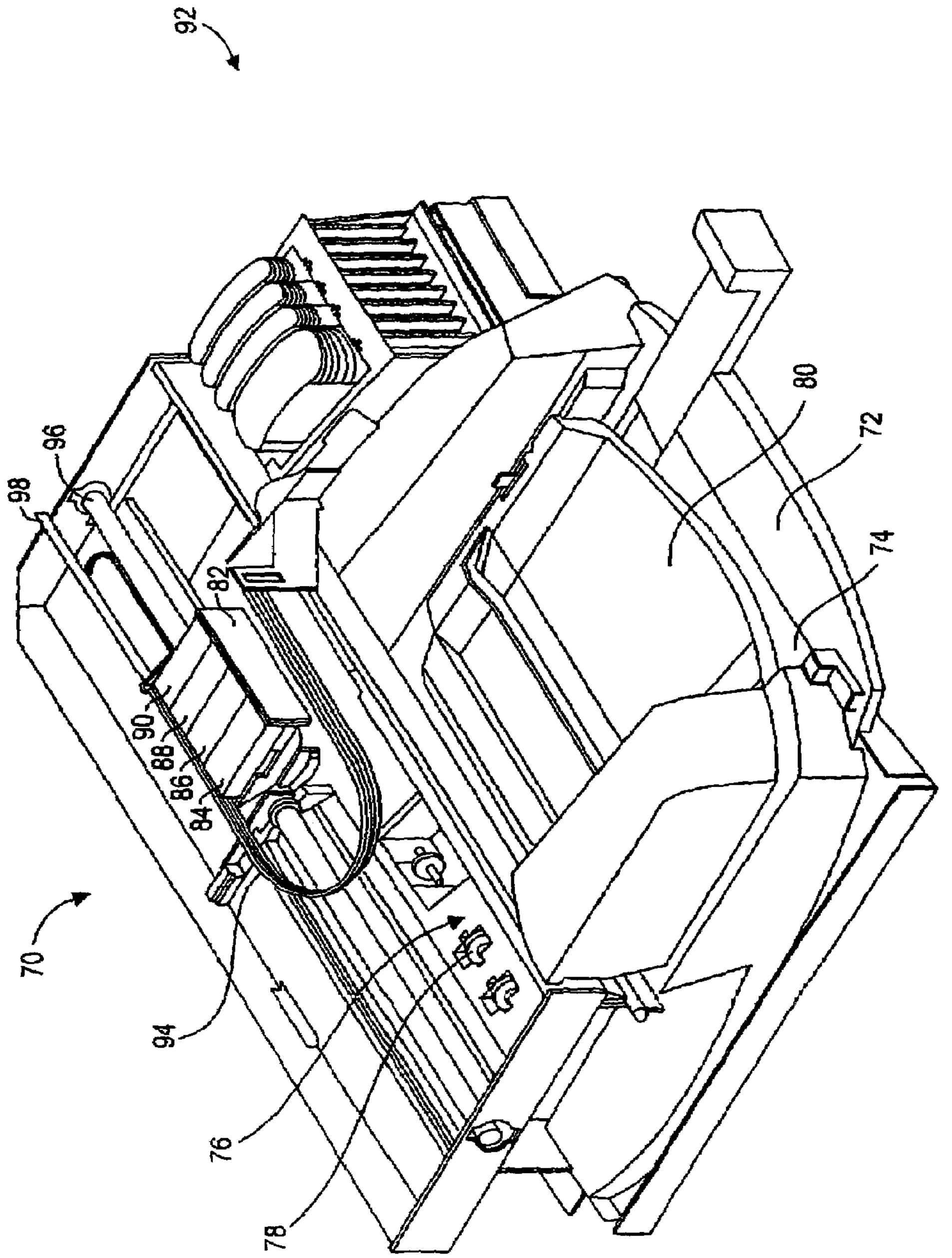
FIG. 8 is a perspective view of a conventional printer, into which the various embodiments of printheads may be installed for printing on a medium.

FIG. 8 illustrates one embodiment of a printer 70 that can incorporate various embodiments of printheads. Numerous other designs of printers may also be used. More detail of a printer is found in U.S. Pat. No. 5,582,459, to Norman Pawlowski et al., incorporated herein by reference.

Printer 70 includes an input tray 72 containing sheets of paper 74, which are forwarded through a print zone 76 using rollers 78 for being printed upon. Paper 74 is then forwarded to an output tray 80. A moveable carriage 82 holds print cartridges 82, 84, 86 and 99, which respectively print cyan (C), black (K), magenta (M), and yellow (Y) fluid.

In one embodiment, fluids in replaceable fluid cartridges 92 are supplied to their associated print cartridges via flexible fluid tubes 94. The print cartridges may also be the type that hold a substantial supply of fluid and may be refillable or non-refillable. In another embodiment, the fluid supplies are separate from the printhead portions and are removably mounted on the printheads in carriage 82.

Carriage 82 is moved along a scan axis by a conventional belt and pulley system and slides along a slide rod 96. In another embodiment, the carriage is stationary, and an array of stationary print cartridges print on a moving sheet of paper.

Printing signals from a conventional external computer (e.g., a PC) are processed by printer 70 to generate a bitmap of the dots to be printed. The bitmap is then converted into firing signals for the printheads. The position of the carriage 82 as it traverses back and forth along the scan axis while printing is determined from an optical encoder strip 98, detected by a photoelectric element on carriage 82, to cause the various fluid ejection elements on each print cartridge to be selectively fired at the appropriate time during a carriage scan.

The printhead may use resistive, piezoelectric, or other types of fluid ejection elements.

As the print cartridges in carriage 82 scan across a sheet of paper, the swaths printed by the print cartridges overlap.

After one or more scans, the sheet of paper 74 is shifted in a direction towards output tray 80, and carriage 82 resumes scanning.

The present invention is equally applicable to alternative printing systems (not shown) that utilize alternative media and/or printhead moving mechanisms, such as those incorporating grit wheel, roll feed, or drum or vacuum belt technology to support and move the print media relative to the printhead assemblies. With a grit wheel design, a grit wheel and pinch roller move the media back and forth along one axis while a carriage carrying one or more printhead assemblies scan past the media along an orthogonal axis. With a drum printer design, the media is mounted to a rotating drum that is rotated along one axis while a carriage carrying one or more printhead assemblies scans past the medial along an orthogonal axis. In either the drum or grit wheel designs, the scanning is typically not done in a back and forth manner as is the case for the system depicted in FIG. 8.

Multiple printheads may be formed on a single substrate. Further, an array of printheads may extend across the entire width of a page so that no scanning of the printheads is needed; only the paper is shifted perpendicular to the array.

Additional print cartridges in the carriage may include other colors or fixers.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of fabricating a fluid ejector comprising:

depositing a plurality of thin film layers on a first surface of a printhead substrate, the plurality of thin film layers forming a thin film membrane, at least one of the layers forming a plurality of fluid ejection elements;

etching the printhead substrate to provide the thin film membrane with a cantilevered section;

etching an elongated gap through the plurality of thin film layer to provide the thin film membrane with a floating section, the floating section being at least partially detached from the cantilevered section and separated from the cantilevered section by the elongated gap;

forming an orifice layer on the thin film membrane;

forming at least one opening in a second surface of the substrate, the at least one opening providing a fluid path from the second surface through the substrate;

wherein the orifice layer supports the floating section of the thin film membrane over the at least one opening in the substrate, the cantilevered section being substantially supported by the substrate; and forming a plurality of fluid feed holes in the floating section of the thin film membrane.

2. The method of claim 1, wherein the orifice layer defines a plurality of fluid ejection chambers, each chamber housing an associated fluid ejection element, the orifice layer further defining a nozzle for each fluid ejection chamber.

3. The method of claim 1, wherein depositing the plurality of thin film layers on a first surface of the substrate includes depositing a field oxide layer, and wherein forming the at least one opening in the second surface of the substrate includes etching a trench in the second surface and using the field oxide layer as an etch stop.

4. The method according to claim 1, wherein the elongated gap has a length greater than a distance between adjacent fluid ejection elements.

5. The method according to claim 1, wherein the elongated gap has a length of about one-half inch or longer.

6. The method of claim 1, wherein the thin film membrane is etched such that the fluid ejection elements overlie the substrate.

7. A method of fabricating a printhead comprising:

providing a substrate;

forming a thin film membrane on a surface of the substrate, wherein forming the thin film membrane comprises providing a row of fluid ejection elements;

forming a fluid opening through the substrate, wherein the fluid opening extends a length of the row of fluid ejection elements; and forming an elongated gap in the thin film membrane, wherein the elongated gap extends a length of the fluid opening and separates an extended section of the thin film membrane and a separated section of the thin film membrane in the fluid opening, wherein the elongated gap prevents contact between the extended section and the separated section for the length of the fluid opening.

8. The method of claim 7, wherein the elongated gap is substantially parallel with the row of fluid ejection elements.

9. The method of claim 7, wherein providing the row of fluid ejection elements comprises providing first and second substantially parallel rows of fluid ejection elements;

wherein forming the elongated gap comprises forming first and second elongated gaps, substantially parallel with the first and second rows of fluid ejection elements; and wherein the first and second elongated gaps define the separated section of the thin film membrane and first and second extended sections of the thin film membrane, and wherein the first extended section is separated from the separated section by the first elongated gap and the second extended section is separated from the separated section by the second elongated gap.

10. The method of claim 7, further comprising forming an orifice layer over the thin film layer, wherein the orifice layer adheres to the extended section and the separated section and supports the separated section over the opening.

11. A method of fabricating a fluid ejector comprising:

depositing a plurality of thin film layers on a first surface of a printhead substrate, the plurality of the thin film layers forming a thin film membrane, at least one of the layers forming a plurality of fluid ejection elements;

etching the printhead substrate to provide the thin film membrane with a cantilevered section;

etching an elongated gap through the plurality of thin film layers to provide the thin film membrane with a floating section, the floating section being at least partially detached from the cantilevered section and separated from the cantilevered section by the elongated gap;

forming an orifice layer on the thin film membrane;

forming at least one opening in a second surface of the substrate, the at least one opening providing a fluid path from the second surface through the substrate;

wherein the orifice layer supports the floating section of the thin film membrane over the at least one opening in the substrate, the cantilevered section being substantially supported by the substrate; and forming a row of fluid feed holes in the separated section, wherein the row of fluid feed holes is substantially parallel with the elongated gap.

12. A method of fabricating a fluid ejector comprising:

depositing a plurality of thin film layers on a first surface of a printhead substrate, the plurality of the thin film layers forming a thin film membrane, at least one of the layers forming a plurality of fluid ejection elements;

etching the printhead substrate to provide the thin film membrane with a cantilevered section;

etching an elongated gap through the plurality of thin film layers to provide the thin film membrane with a floating section, the floating section being at least partially detached from the cantilevered section and separated from the cantilevered section by the elongated gap;

forming an orifice layer on the thin film membrane;

forming at least one opening in a second surface of the substrate, the at least one opening providing a fluid path from the second surface through the substrate;

wherein the orifice layer supports the floating section of the thin film membrane over the at least one opening in the substrate, the cantilevered section being substantially supported by the substrate; and forming first and second rows of fluid feed holes in the separated section, wherein the first row of fluid feed holes is adjacent to and substantially parallel with the first elongated gap and wherein the second row of fluid feed holes is adjacent to and substantially parallel with the second elongated gap.

13. A method of fabricating a fluid ejector comprising:

depositing a plurality of thin film layers on a first surface of a printhead substrate, the plurality of the thin film layers forming a thin film membrane, at least one of the layers forming a plurality of fluid ejection elements;

etching the printhead substrate to provide the thin film membrane with a cantilevered section;

etching an elongated gap through the plurality of thin film layers to provide the thin film membrane with a floating section, the floating section being at least partially detached from the cantilevered section and separated from the cantilevered section by the elongated gap;

forming an orifice layer on the thin film membrane;

forming at least one opening in a second surface of the substrate, the at least one opening providing a fluid path from the second surface through the substrate;

wherein the orifice layer supports the floating section of the thin film membrane over the at least one opening in the substrate, the cantilevered section being substantially supported by the substrate; and forming a row of fluid feed holes in the separated section.

14. A method of fabricating a fluid ejector comprising:

depositing a plurality of thin film layers on a first surface of a printhead substrate, the plurality of thin film layers forming a thin film membrane, at least one of the layers forming a row of fluid ejection elements;

etching first and second elongated gaps through the plurality of thin film layers to provide the thin film membrane with a floating section and first and second cantilevered sections, wherein the first and second elongated gaps each extend a length of the row of fluid ejection elements, wherein the floating section is separated from the first cantilevered section for the length of the row of fluid ejection elements by the first elongated gap and separated from the second cantilevered section for the length of the row of fluid ejection elements by the second elongated gap;

forming an orifice layer on the thin film membrane;

forming at least one opening in a second surface of the substrate, the at least one opening extending the length of the row of fluid election elements and providing a fluid path from the second surface through the substrate, wherein the orifice layer supports the floating section of the thin film membrane over the at least one opening in the substrate, the cantilevered section being substantially supported by the substrate.

15. A method of fabricating a fluid ejector comprising:

depositing a plurality of thin film layers on a first surface of a printhead substrate, the plurality of the thin film layers forming a thin film membrane, at least one of the layers forming a plurality of fluid ejection elements;

etching the printhead substrate to provide the thin film membrane with a cantilevered section;

etching an elongated gap through the plurality of thin film layers to provide the thin film membrane with a floating section, the floating section being at least partially detached from the cantilevered section and separated from the cantilevered section by the elongated gap;

forming an orifice layer on the thin film membrane;

forming at least one opening in a second surface of the substrate, the at least one opening providing a fluid path from the second surface through the substrate;

wherein the orifice layer supports the floating section of the thin film membrane over the at least one opening in the substrate, the cantilevered section being substantially supported by the substrate; and securing the floating section of the thin film membrane to the orifice layer, including:

forming at least one opening in the floating section of the thin film membrane;

etching a portion of the substrate exposed by the at least one opening in the floating section to undercut the floating section and create at least one cavity in the substrate; and depositing a material for the orifice layer on the thin film membrane and into the at least one cavity.

16. A method of fabricating a fluid ejector comprising:

depositing a plurality of thin film layers on a first surface of a printhead substrate, the plurality of thin film layers forming a thin film membrane, at least one of the layers forming a plurality of fluid ejection elements;

etching the printhead substrate to provide the thin film membrane with a cantilevered section;

etching the plurality of thin film layers to provide the thin film membrane with a floating section, the floating section being at least partially detached from the cantilevered section;

forming an orifice layer on the thin film membrane;

forming at least one opening in a second surface of the substrate, the at least one opening providing a fluid path from the second surface through the substrate, wherein the orifice layer supports the floating section of the thin film membrane over the at least one opening in the substrate, the cantilevered section being substantially supported by the substrate;

securing the floating section of the thin film membrane to the orifice layer, including:

forming at least one opening in the floating section of the thin film membrane;

etching a portion of the substrate exposed by the at least one opening in the floating section to undercut the floating section and create at least one cavity in the substrate; and depositing a material for the orifice layer on the thin film membrane and into the at least one cavity.

17. A method of fabricating a fluid ejector comprising:

depositing a thin film membrane on a first surface of a substrate, wherein the thin film membrane comprises a plurality of fluid ejection elements arranged in a row having a row length;

forming at least one opening in a second surface of the substrate, the at least one opening providing a fluid path from the second surface through the substrate;

forming a gap in the thin film membrane alongside and parallel with the row of fluid ejection elements, wherein the gap has a gap length greater than or equal to the row length, and wherein the gap defines a cantilevered section of the thin film membrane and a floating section of the thin film membrane and separates the cantilevered section from the floating section;

forming a plurality of fluid feed holes in the floating section of the thin film membrane.

18. The method according to claim 17, wherein the plurality of fluid ejection elements comprises at least 150 fluid ejection elements.

19. The method according to claim 17, wherein the gap has a length of at least one-half inch.

20. The method according to claim 17, wherein the floating section of the thin film membrane is separated on all sides from other portions of the thin film membrane.

21. The method of claim 17, wherein depositing the plurality of thin film layers on a first surface of the substrate includes depositing a field oxide layer, and wherein forming the at least one opening in the second surface of the substrate includes etching a trench in the second surface and using the field oxide layer as an etch stop.

22. The method according to claim 17, comprising forming an orifice layer on the thin film membrane, wherein the orifice layer supports the floating section of the thin film membrane over the at least one opening in the substrate, the cantilevered section being substantially supported by the substrate.

23. The method of claim 22, wherein the orifice layer defines a plurality of fluid ejection chambers, each chamber housing an associated fluid ejection element, the orifice layer further defining a nozzle for each fluid ejection chamber.

24. The method according to claim 17, wherein the plurality of fluid election elements arranged in a row having a row length comprises a first plurality of fluid ejection elements arranged in a first row having a first row length and a second plurality of fluid ejection elements arranged in a second row having a second row length, wherein forming the gap comprises forming a first gap in the thin film membrane alongside and parallel with the first row of fluid ejection elements and forming a second gap in the thin film membrane alongside and parallel with the second row of fluid ejection elements;

wherein the first and second gaps define the floating section of the thin film membrane between the first and second rows.

25. The method according to claim 24, comprising forming a first plurality of fluid feed holes in the floating section of the thin film membrane alongside the first gap and forming a second plurality of fluid feed holes in the floating section of the thin film membrane alongside the second gap.

26. The method according to claim 24, comprising forming an orifice layer on the thin film membrane, wherein the orifice layer supports the floating section of the thin film membrane over the at least one opening in the substrate, the cantilevered section being substantially supported by the substrate.

27. The method according to claim 24, wherein at least one of the first or second pluralities of fluid ejection elements comprises at least 150 fluid ejection elements.

28. The method according to claim 24, wherein at least one of the first or second gaps has a length of about one-half inch or longer.

29. The method according to claim 24, wherein the floating section of the thin film membrane is separated on all sides from other portions of the thin film membrane.

30. The method according to claim 24, wherein forming the first gap defines a first cantilevered portion of the thin film membrane and forming the second gap defines a second cantilevered portion of the thin film membrane, and wherein the floating section of the thin film membrane is separated from the first and second cantilevered portions of the thin film membrane by the first and second gaps respectively.

* * * * *

UNITED STATES PATENT AND TRADEMARK OFFICE

CERTIFICATE OF CORRECTION

PATENT NO. : 6,974,548 B2
APPLICATION NO. : 10/430645
DATED : December 13, 2005
INVENTOR(S) : Matthew D Giere et al.

It is certified that error appears in the above-identified patent and that said Letters Patent is hereby corrected as shown below:

In column 7, line 43, in Claim 1, delete “layer” and insert -- layers --, therefor.

In column 8, line 44, in Claim 10, after “over the” insert -- fluid --.

In column 10, line 1, in Claim 14, delete “election” and insert -- ejection --, therefor.

Signed and Sealed this

Twelfth Day of May, 2009

JOHN DOLL
*Acting Director of the United States Patent and Trademark Office*